(12) United States Patent
Rodgers, Jr. et al.

(10) Patent No.: US 8,539,976 B1
(45) Date of Patent: Sep. 24, 2013

(54) BACK PRESSURE VALVE WITH DOUBLE BARRIER SEALING

(76) Inventors: Doyle Wayne Rodgers, Jr., Gladewater, TX (US); James Otis Miller, Tomball, TX (US)

( * ) Notice: Subject to any disclaimer, the term of this patent is extended or adjusted under 35 U.S.C. 154(b) by 0 days.

(21) Appl. No.: 13/233,106

(22) Filed: Sep. 15, 2011

(51) Int. Cl.
*F16K 15/06* (2006.01)

(52) U.S. Cl.
USPC ..................................... 137/512; 137/543.23

(58) Field of Classification Search
USPC .......................... 137/512, 512.3, 513, 543.23
See application file for complete search history.

(56) References Cited

U.S. PATENT DOCUMENTS

| | | | |
|---|---|---|---|
| 2,278,050 A | | 3/1942 | Allen et al. |
| 2,306,012 A | * | 12/1942 | Campbell ...................... 137/512 |
| 3,102,709 A | | 9/1963 | Allen |
| 3,379,255 A | | 4/1968 | Burns, Jr. et al. |
| 4,265,424 A | | 5/1981 | Jones |
| 4,550,895 A | | 11/1985 | Shaffer |
| 5,148,828 A | * | 9/1992 | Farnham ...................... 137/454.6 |
| 5,320,181 A | | 6/1994 | Lantier, Sr. et al. |
| 5,333,832 A | | 8/1994 | Bartholomew et al. |
| 5,944,110 A | | 8/1999 | Watts et al. |
| 6,089,526 A | | 7/2000 | Olson |
| 6,857,634 B2 | | 2/2005 | Araujo |
| 6,955,357 B2 | | 10/2005 | Griffin et al. |
| 7,793,732 B2 | | 9/2010 | Xu et al. |
| 8,230,875 B2 | * | 7/2012 | Norman .................... 137/315.33 |
| 2004/0238042 A1 | * | 12/2004 | Takeda .......................... 137/512 |
| 2010/0258319 A1 | | 10/2010 | Nguyen et al. |

* cited by examiner

*Primary Examiner* — Kevin Lee
*Assistant Examiner* — Macade Brown
(74) *Attorney, Agent, or Firm* — Buskop Law Group, P.C; Wendy Buskop

(57) ABSTRACT

A back pressure valve for providing a double barrier to flow for use with a tubing hanger within a well bore, wherein the back pressure valve can have a first body piece threadably engaged and sealed with a second body piece. A first piston can engage a first surface for sealing bottom pressure to provide a first barrier to flow. A second piston can engage a second surface for redundantly sealing bottom pressure to provide a second barrier to flow. The back pressure valve can have one-way and two-way back pressure valve assemblies. The two-way back pressure valve assembly can include a bidirectional piston having a double sealing face for engaging sealing surfaces and sealing bottom pressure from the well bore while allowing testing without stopping a flow of fluid.

10 Claims, 6 Drawing Sheets

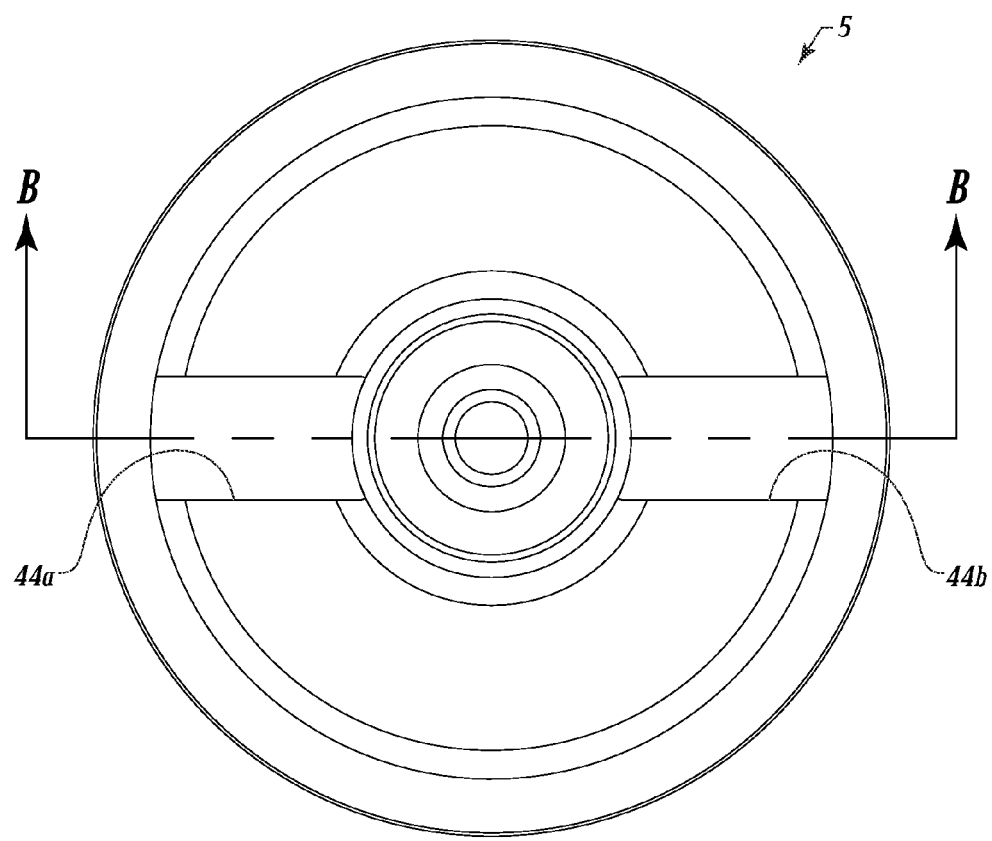

BACK PRESSURE VALVE WITH DOUBLE BARRIER SEALING

FIELD

The present embodiments generally relate to a back pressure valve that provides a double barrier to flow for use within a tubing hanger within a well bore.

BACKGROUND

A need exists for a back pressure valve with redundant seals that allows fluid to flow through the back pressure valve in a first direction, and provides a secure fluid-tight engagement in a second direction.

A further need exists for a back pressure valve that provides a double barrier to flow.

A further need exists for a reliable back pressure valve that has moving stems in alignment with each other.

A further need exists for a back pressure valve having a first body piece with a first piston threadably connected to a second body piece with a second piston for controlling flow with a double barrier.

The present embodiments meet these needs.

BRIEF DESCRIPTION OF THE DRAWINGS

The detailed description will be better understood in conjunction with the accompanying drawings as follows:

FIG. 1C depicts a top view of the back pressure valve of FIG. 1A.

Figure 1A:
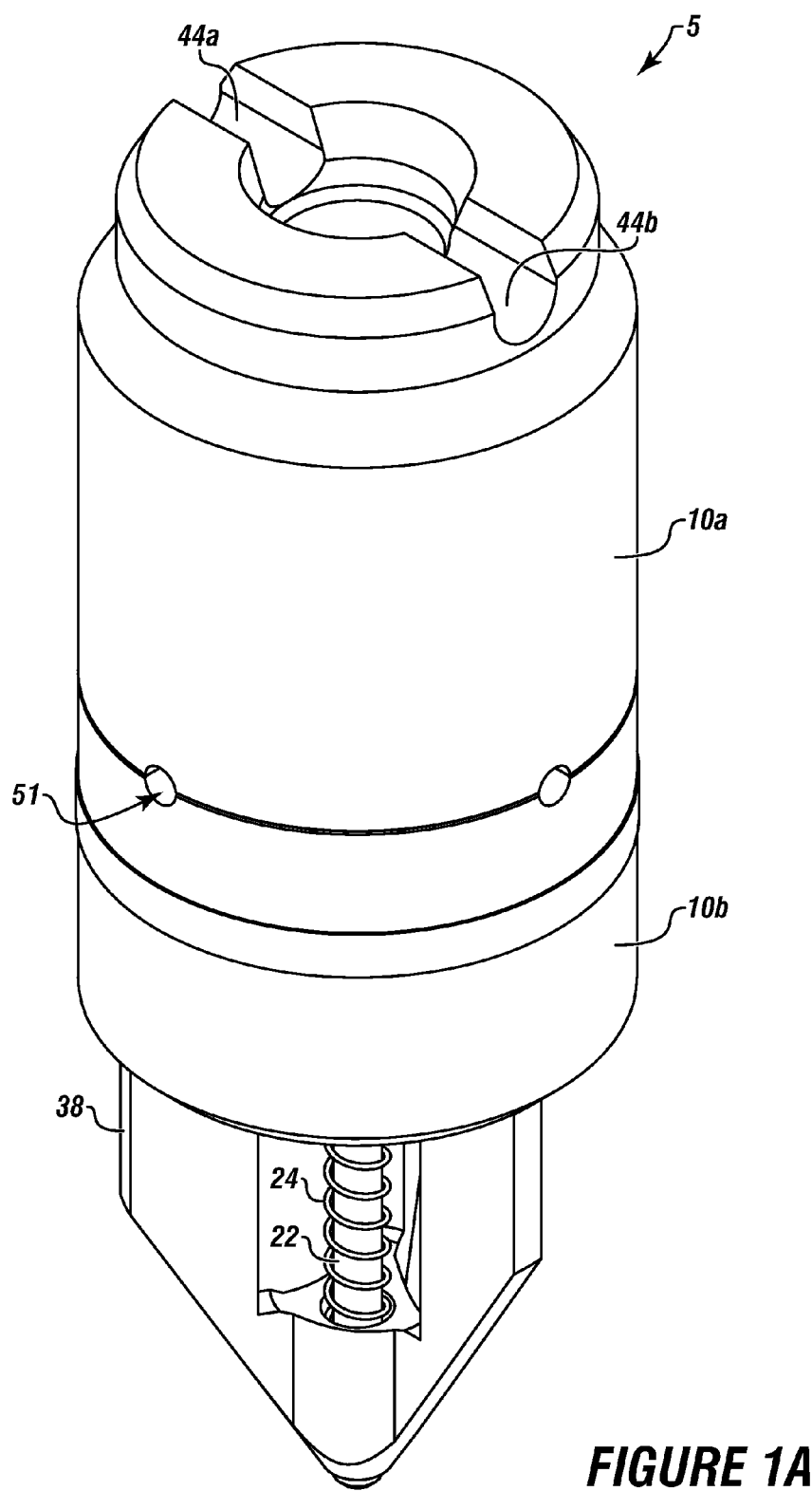
FIG. 1A depicts an embodiment of a back pressure valve with a double barrier to flow.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a back pressure valve with redundant sealing. The back pressure valve can be configured to allow for independent control of the redundant seals. For example, the redundant sealing can provide double barrier flow control using two pistons for sealing with sealing surfaces within the back pressure valve.

In embodiments, the back pressure valve can be used within a tubing hanger within a well bore.

The back pressure valve can be attached to a running tool portion of a high pressure lubricator, and the high pressure lubricator can be mounted to a top cap of a land-based or subsea christmas tree.

The back pressure valve can be threadably engaged with the tubing hanger, allowing an operator to open all valves in a run of the christmas tree. As such, the back pressure valve can have access to a preparation in the tubing hanger, and fluid can flow into an associated well while being prevented from exiting through the back pressure valve.

In operation, torque can be applied to the back pressure valve to seal the back pressure valve to the tubing hanger. The high pressure lubricator can then be removed, and servicing of an associated well head or christmas tree can be safely performed.

In operation, the redundant seals of the back pressure valve can be unseated simultaneously with the high pressure lubricator for testing or servicing the well.

Also, a first redundant seal formed with a first sealing surface can be unseated for testing the first redundant seal, while allowing a second redundant seal formed with a second seal surface to remain seated to prevent fluid from flowing from the well.

The back pressure valve can have a cylindrical two-piece body with a bore hole formed there thru. The cylindrical two-piece body can have a first body piece and second body piece threadably engaged together. For example, the first body piece can be threaded to an inner surface of the second body piece, such as with threaded sections ranging from about 1 inch to about 2 inches long.

The cylindrical two-piece body can have a sealing means, such as a body sealing surface and a seal, which can seal the first body piece to the second body piece.

A first pressure piston can be disposed and/or contained within the bore hole.

The first pressure piston can be configured to sealably engage with a first sealing surface in the bore hole. As such, the first pressure piston, along with the first sealing surface, can seal bottom pressure from the well bore, providing a first barrier to flow.

A first moving stem and first compression spring assembly can hold the first pressure piston in a first position relative to the cylindrical two-piece body.

The first moving stem can align the first pressure piston in the cylindrical two-piece body. The first moving stem can have a first stem alignment flange for engagement with the first pressure piston.

A second moving stem and second compression spring assembly can hold a second pressure piston within the bore hole. The second pressure piston can be aligned with a second sealing surface.

The second pressure piston can configured to sealably engage with the second sealing surface. As such, the second pressure piston, along with the second sealing surface, can redundantly seal bottom pressure from the well bore, providing a second barrier to flow.

The second moving stem can have a second stem alignment flange for engagement with the second pressure piston.

A guide plate can be disposed within the cylindrical two-piece body. The guide plate can centralize the second moving stem within the cylindrical two-piece body.

In one or more embodiments, the guide plate can be from about 0.375 inches to about ¾ of an inch thick. The guide plate can be any size depending upon the particular application.

The guide plate can be made of high carbon steel, chrome molybdenum steel, or another material.

In one or more embodiments, the guide plate can have a flow means, such as one or more flow passageways disposed through the guide plate. The flow passageways can have a diameter ranging from about ⅛ of an inch to about ⅜ of an inch.

One or more stabilizer legs can be connected between the second body piece and a centralizer alignment hole. The stabilizer legs can taper towards the centralizer alignment hole. The stabilizer legs can be tapered at angles ranging from about 15 degrees to about 45 degrees. The centralizer alignment hole can contain a portion of the first moving stem.

In operation, the stabilizer legs can be inserted into the tubing hanger, and outer threads disposed on an outer surface of the second body piece can be used to connect the cylindrical two-piece body to the tubing hanger. The tapering of the stabilizer legs can facilitate alignment of the back pressure valve into the tubing hanger.

In one or more embodiments, the first body piece can have a plurality of running threads disposed on an inner surface thereof. The plurality of running threads can be used for connecting the first body piece to a running tool.

One or more detent notches can be formed or disposed on a top of the first body piece for receiving the running tool.

A groove can be formed into an outer surface of the second body piece for receiving a seal, such as a thermoplastic seal. The groove and seal can form a seal between the second body piece and the tubing hanger.

The back pressure valve can include a first spring holding means, such as a first counter bore spring seat formed into a portion of the one or more stabilizer legs or the centralizer alignment hole. The first spring holding means can receive and retain a portion of a first compression spring.

The back pressure valve can include a second spring holding means, such as a second counter bore spring seat formed into a portion of the guide plate. The second spring holding means can receive and retain a portion of a second compression spring.

One or more embodiments relate to a back pressure valve assembly having a two-way back pressure valve assembly aligned with a one-way back pressure valve assembly for use within the tubing hanger within the well bore.

The first body piece can be threadably engaged with the second body piece to form the cylindrical two-piece body.

The cylindrical two-piece body can have a diameter ranging from about 1 13/16 inches to about 6 5/8 inches, and a length ranging from about 8 inches to about 20 inches. The cylindrical two-piece body can be made of steel or another structurally rigid material, such as AISI 4130 or 17/4 ph steel.

A pressure piston can be disposed within a bore hole of the first body piece. The bore hole can have a diameter ranging from about 3/4 of an inch to about 1.5 inches. The bore hole can have any diameter depending upon the particular application.

The pressure piston can be configured to sealingly engage with a sealing surface in the bore hole to provide a barrier to flow.

A moving stem and a compression spring can be disposed within the bore hole for holding the pressure piston in a first position relative to the cylindrical two-piece body. The moving stem can align the pressure piston in the cylindrical two-piece body.

A bidirectional piston can be disposed within the bore hole of the second body piece. The bidirectional piston can have a double sealing face aligned with a second upper sealing surface and second lower sealing surface.

The double sealing face can be configured to sealingly engage with the second upper sealing surface and second lower sealing surface for sealing bottom pressure from the well bore while allowing testing or service of a christmas tree without preventing a flow of hydrocarbon from the well.

The bidirectional piston can have a one or more extensions for guiding movement of the bidirectional piston to provide for sealing between the second body piece and the moving stem.

A containment cap can support a containment cap seal for sealing the back pressure valve to the containment cap.

Figure 1B:
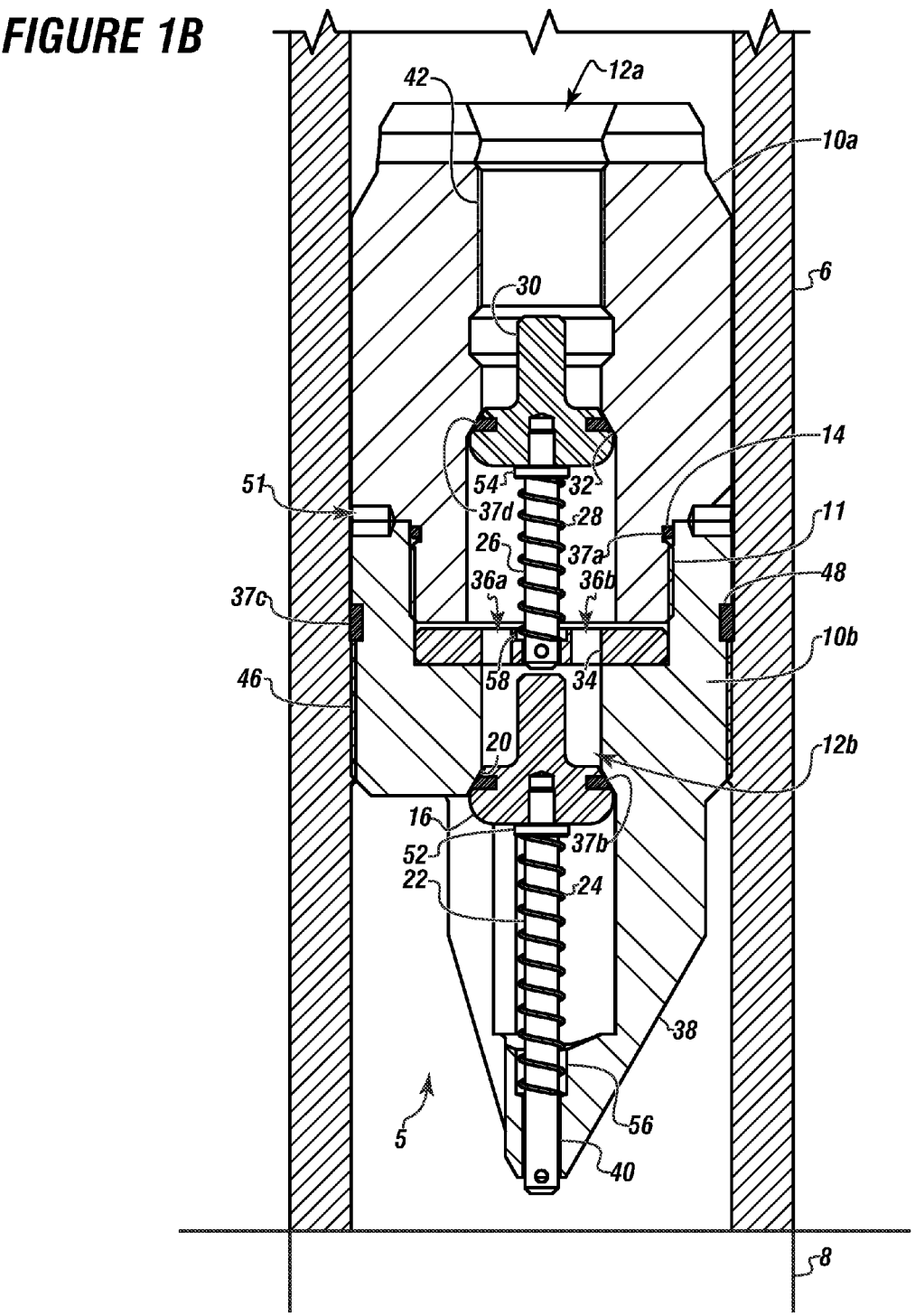
FIG. 1B depicts a cross section of the back pressure valve of FIG. 1A.

Turning now to the Figures, FIG. 1A depicts an embodiment of a back pressure valve with a double barrier to flow, FIG. 1B depicts a cross section of the back pressure valve of FIG. 1A and FIG. 1C depicts a top view of the back pressure valve of FIG. 1A.

FIGS. 1A-1C depict an embodiment of a back pressure valve 5 for use within a tubing hanger 6 within a well bore 8.

The back pressure valve 5 can include a cylindrical two-piece body, including a first body piece 10a and second body piece 10b. The first body piece 10a can be threadably engaged with the second body piece 10b, such as with threads 11. For example, the first body piece 10a can be threaded to an inner surface of the second body piece 10b.

In one or more embodiments, the first body piece 10a can have a body sealing surface 14 for receiving a first seal 37a for sealing between the first body piece 10a and second body piece 10b.

The back pressure valve 5 can include a drilled or tapped hole 51 configured to receive a set screw for preventing rotation of the first body piece 10a relative to the second body piece 10b.

The cylindrical two-piece body can have a first bore hole 12a and a second bore hole 12b. The first bore hole 12a can be in fluid communication with the second bore hole 12b.

A guide plate 34 can be disposed within the first bore hole 12a and/or the second bore hole 12b. For example, a portion of the guide plate 34 can be engaged between the first body piece 10a and the second body piece 10b for securing the guide plate 34 within the cylindrical two-piece body.

The guide plate 34 can include one or more flow passageways 36a and 36b. For example, in one or more embodiments, the guide plate 34 can have from about four flow passageways to about eight flow passageways.

A first pressure piston 16 can be disposed within the second bore hole 12b and second body piece 10b. The first pressure piston 16 can be at least partially contained within the second bore hole 12b.

The first pressure piston 16 can be configured to sealingly engage with a first sealing surface 20 on the second body piece 10b. For example, the first pressure piston 16 can have a second seal 37b for sealing with the first sealing surface 20.

In operation, the first pressure piston 16, along with the first sealing surface 20, can seal bottom pressure from the well bore 8 to provide a first barrier to flow.

A first moving stem 22 can be engaged at one end with the first pressure piston 16 for holding the first pressure piston 16 in a first position relative to the cylindrical two-piece body. For example, the first moving stem 22 can have a first stem alignment flange 52 engaged with the first pressure piston 16.

One or more stabilizer legs 38 can be connected to the second body piece 10b at one end. A centralizer alignment hole 40 can be formed in the one or more stabilizer legs 38 opposite the second body piece 10b.

The first moving stem 22 can be engaged through the centralizer alignment hole 40 opposite the second body piece 10b.

A first counter bore spring seat 56 can be formed in or disposed on the one or more stabilizer legs 38 about the centralizer alignment hole 40. The first counter bore spring seat 56 can be configured to receive a first compression spring 24. The first compression spring 24 can be engaged about the first moving stem 22.

In operation, the first moving stem 22 can be configured to align the first pressure piston 16 with the second body piece 10b.

The second body piece 10b can have a groove 48 on an outer surface thereof. The groove 48 can be configured to receive a third seal 37c. In one or more embodiments, each seal usable with the back pressure valve 5 can be a thermoplastic seal.

In one or more embodiments, outer threads 46 can be formed or disposed on the outer surface of the second body piece 10b for connecting the second body piece 10b to the tubing hanger 6.

A second pressure piston 30 can be disposed within the first bore hole 12a and the first body piece 10a.

The second pressure piston 30 can be configured to sealingly engage with a second sealing surface 32 in the first body piece 10a. For example, the second pressure piston 30 can have a fourth seal 37d for sealing with the second sealing surface 32.

In operation, the second pressure piston 30, along with the second sealing surface 32, can redundantly seal bottom pressure from the well bore 8; thereby providing a second barrier to flow.

A second moving stem 26 can be engaged with the second pressure piston 30 for holding the second pressure piston 30 within the first bore hole 12a in the first body piece 10a, and maintaining the second pressure piston 30 in alignment with the second sealing surface 32. For example, the second moving stem 26 can include a second stem alignment flange 54 engaged with the second pressure piston 30.

The second moving stem 26 can be engaged with the guide plate 34 at one end for centralizing the second moving stem 26 in the first body piece 10a.

A second counter bore spring seat 58 can be formed or disposed in the guide plate 34 for receiving a second compression spring 28. The second compression spring 28 can be engaged about the second moving stem 26.

In one or more embodiments, the first body piece 10a can have a plurality of running threads 42 disposed on an inner surface thereof for engagement with a running tool.

One or more detent notches 44a and 44b can be formed in the first body piece 10a for receiving the running tool.

In operation, the back pressure valve 5 can be deployed into the tubing hanger 6 in order to control the well bore 8 during testing or servicing of the well bore 8.

The double barrier flow control provided by the back pressure valve 5 can be used to replace the common practice of running a down hole packer in conjunction with a single conventional back pressure valve.

As such, the back pressure valve 5 can eliminate the need for a set-up operation and testing operation required with a down hole valve by providing the double barrier to flow in the tubing hanger 6 with a single back pressure valve 5.

Figure 2A:
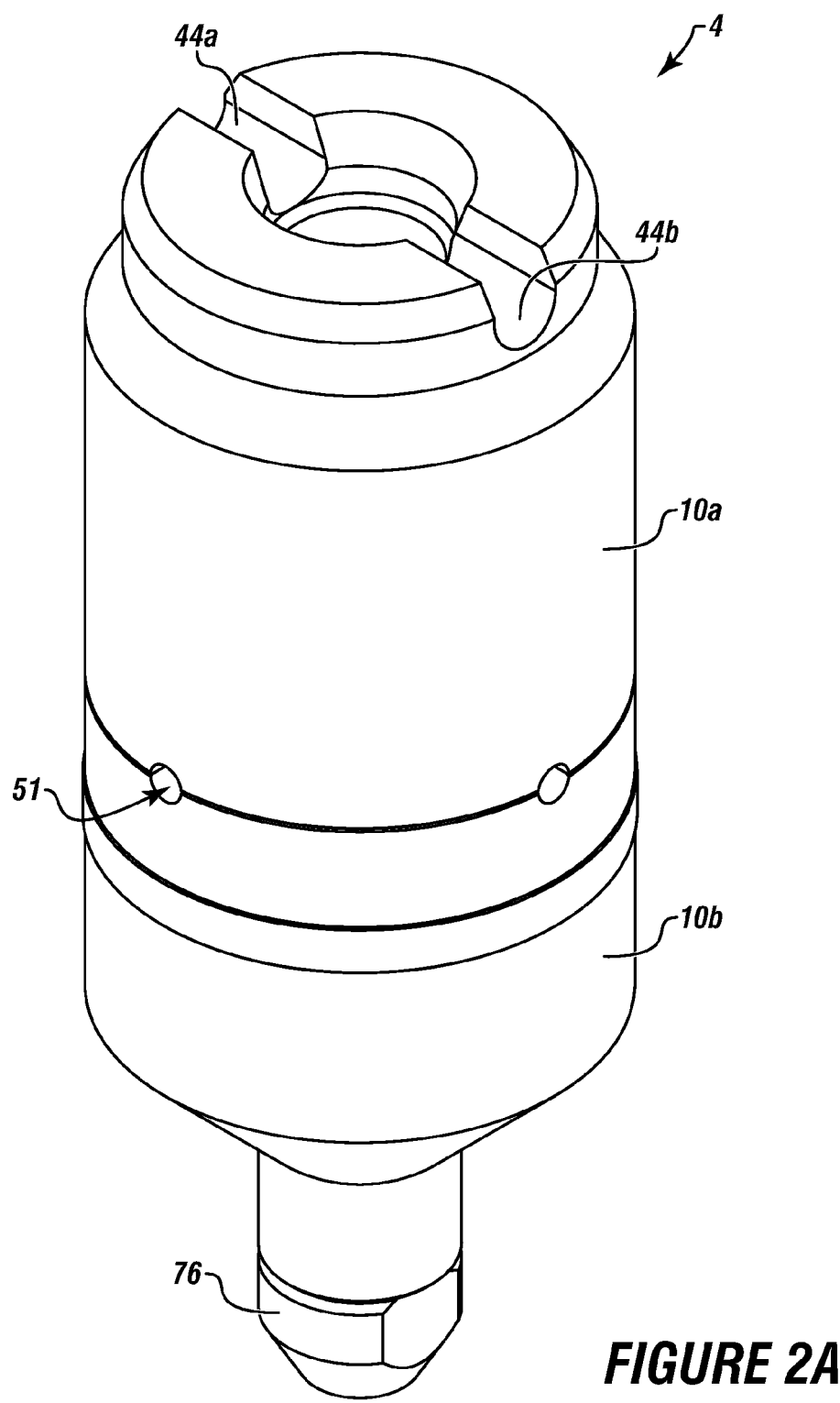
FIG. 2A depicts another embodiment of a back pressure valve with a double barrier to flow.
Figure 2B:
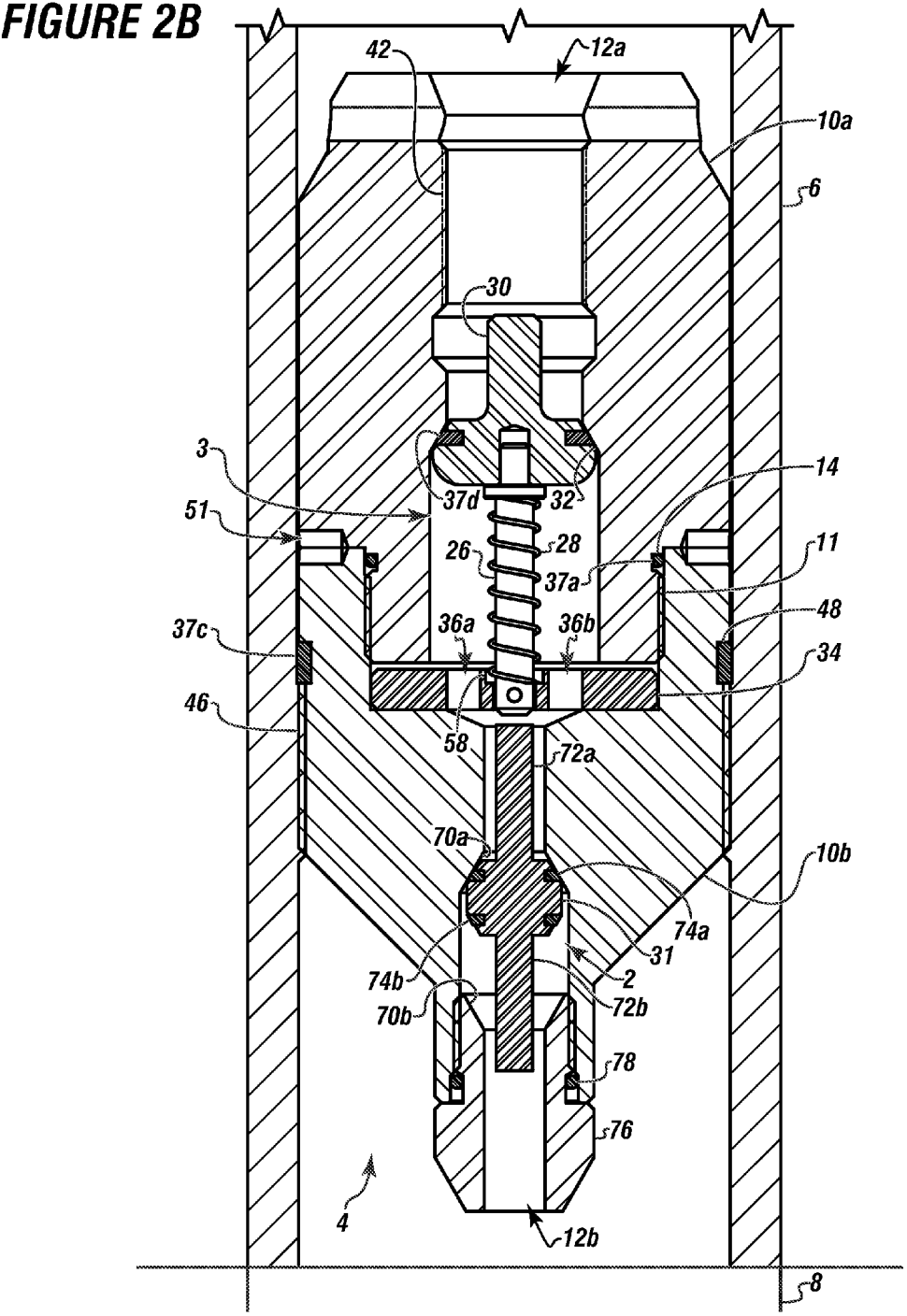
FIG. 2B depicts a cross section of the back pressure valve of FIG. 2A.
Figure 2C:
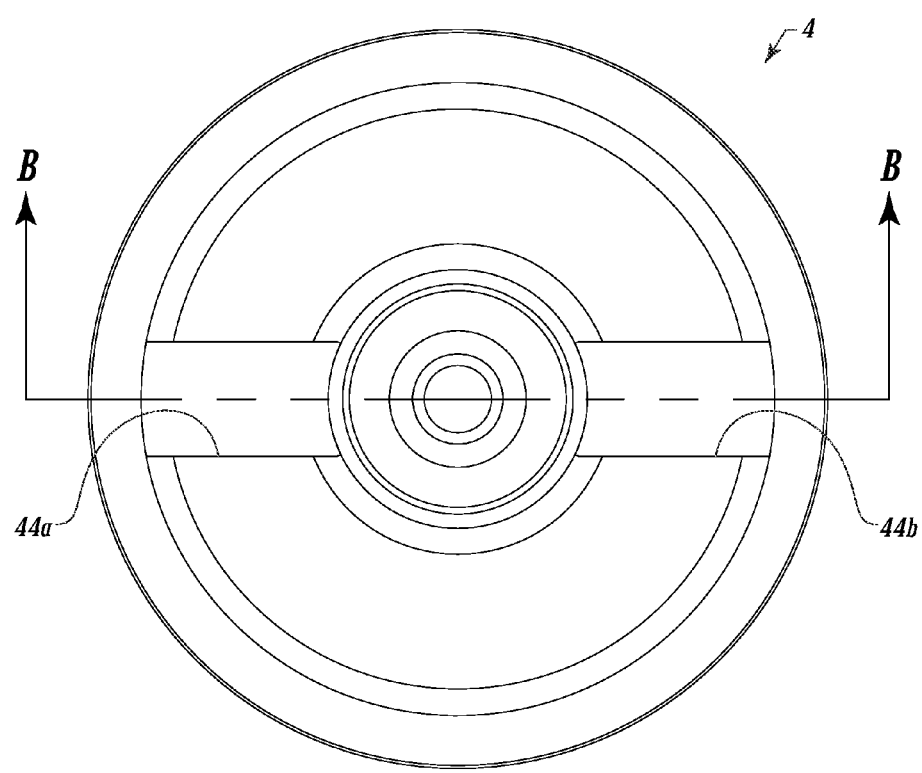
FIG. 2C depicts a top view of the back pressure valve of FIG. 2A.

FIG. 2A depicts another embodiment of a back pressure valve with a double barrier to flow, FIG. 2B depicts a cross section of the back pressure valve of FIG. 2A and FIG. 2C depicts a top view of the back pressure valve of FIG. 2A.

FIGS. 2A-2C depict an embodiment of a back pressure valve assembly 4 for use within a tubing hanger 6 within a well bore 8.

The back pressure valve assembly 4 can include a first body piece 10a threadably engaged with a second body piece 10b with threads 11, forming a cylindrical two-piece body.

A first seal 37a can seal between the first body piece 10a and the second body piece 10b. For example, the first seal 37a can seal on a body sealing surface 14.

The first body piece 10a can have a first bore hole 12a disposed therethrough. A one-way back pressure valve assembly 3 can be disposed within the first bore hole 12a.

The one-way back pressure valve assembly 3 can include a pressure piston 30 disposed within the first bore hole 12a.

The one-way back pressure valve assembly 3 can include a sealing surface 32 disposed in the first bore hole 12a.

The pressure piston 30 can be configured to sealingly engage with the sealing surface 32. For example, a fourth seal 37d can seal with the sealing surface 32.

The one-way back pressure valve assembly 3 can include a moving stem 26. The moving stem 26 can be engaged with the pressure piston 30 for holding the pressure piston 30 in a first position relative to the first body piece 10a. The moving stem 26 can be configured to align the pressure piston 30 in the first body piece 10a.

A compression spring 28 can be engaged about the moving stem 26 within the first bore hole 12a.

The moving stem 26 can be engaged through a guide plate 34 having one or more flow passageways 36a and 36b. A portion of the guide plate 34 can be engaged between the first body piece 10a and second body piece 10b.

A counter bore spring seat 58 can be disposed or formed in the guide plate 34 for holding the compression spring 28.

A drilled or tapped hole 51 can be formed in the first body piece 10a and second body piece 10b for receiving a set screw for preventing rotation of the first body piece 10a relative to the second body piece 10b.

A plurality of running threads 42 can be disposed on an inner surface of the first body piece 10a for engaging with a running tool.

Detent notches 44a and 44b can be formed in the top of the first body piece 10a for receiving the running tool.

The second body piece 10b can include a second bore hole 12b in fluid communication with the first bore hole 12a.

A two-way back pressure valve assembly 2 can be disposed within the second bore hole 12b and aligned with the one-way back pressure valve assembly 3.

The two-way back pressure valve assembly 2 can include a bidirectional piston 31 disposed within the second bore hole 12b. The bidirectional piston 31 can include a first extension 72a and second extension 72b for guiding movement of the bidirectional piston 31 within the second bore hole 12b.

The bidirectional piston 31 can include a double sealing face, including double sealing face 74a and double sealing face 74b. The double sealing faces 74a and 74b can be disposed between the first extension 72a and second extension 72b.

The two-way back pressure valve assembly 2 can include a second upper sealing surface 70a and second lower sealing surface 70b. In operation, the double sealing faces 74a and 74b can be configured to engage with the second upper sealing surface 70a and second lower sealing surface 70b for sealing between the second body piece 10b and the moving stem 26.

The two-way back pressure valve assembly 2 can include a containment cap 76 engaged with the second body piece 10b and supporting a containment cap seal 78 for sealing the two-way back pressure valve assembly 2 to the containment cap 76.

The bidirectional piston 31 can seal bottom pressure from the well bore 8 while allowing testing or service of a christmas tree without preventing a flow of hydrocarbon from the well bore 8.

The second body piece 10b can have a groove 48 on an outer surface thereof. The groove 48 can be configured to receive a third seal 37c.

Outer threads 46 can be formed or disposed on the outer surface of the second body piece 10b for connecting the second body piece 10b to the tubing hanger 6.

In operation, the bidirectional piston 31 can be used to test the entire work over or service unit, including the one-way back pressure valve assembly 3.

For example, pressure can be applied into the first bore hole 12a and second bore hole 12b, and the pressure can be built up to initiate engagement of the double sealing face 74b with the second lower sealing surface 70b; thereby testing the seal between the bidirectional piston 31 and the second lower sealing surface 70b, as well as testing seals of any equipment in-line with the tubing hanger 6.

Once pressure is no longer provided, the built up pressure can energize the pressure piston 30 to seal with the sealing surface 32; thereby testing the seal between the pressure piston 30 and the sealing surface 32.

While these embodiments have been described with emphasis on the embodiments, it should be understood that within the scope of the appended claims, the embodiments might be practiced other than as specifically described herein.

What is claimed is:

1. A back pressure valve for providing a double barrier to flow for use within a tubing hanger within a well bore, the back pressure valve comprising:
   a. a cylindrical two-piece body with a bore hole therethrough, wherein the cylindrical two-piece body comprises a first body piece engaged with a second body piece, and wherein the cylindrical two-piece body comprises a body sealing surface for sealing between the first body piece and the second body piece;
   b. a first pressure piston disposed within the bore hole, wherein the first pressure piston is configured to sealingly engage a first sealing surface in the second body piece, and wherein the first pressure piston with the first sealing surface seals bottom pressure from the well bore, providing a first barrier to flow;
   c. a first moving stem engaged with a first compression spring, wherein the first moving stem has a first stem first end engaged with the first pressure piston for holding the first pressure piston in a first position relative to the cylindrical two-piece body, and wherein the first moving stem is configured to align the first pressure piston with the second body piece, and wherein the first moving stem has a first stem second end disposed through a centralizer alignment hole;
   d. a second pressure piston disposed within the bore hole, wherein the second pressure piston is configured to sealing engage a second sealing surface in the first body piece, and wherein the second pressure piston with the second sealing surface seals bottom pressure from the well bore, providing a second barrier to flow;
   e. a second moving stem engaged with a second compression spring, wherein the second moving stem has a second stem first end engaged with the second pressure piston for holding the second pressure piston within the bore hole and in alignment with the second sealing surface;
   f. a guide plate disposed within the bore hole and engaged between the first body piece and the second body piece for receiving a second stem second end and centralizing the second moving stem in the cylindrical two-piece body, wherein the guide plate comprises a plurality of flow passageways; and
   g. a plurality of stabilizer legs, wherein each stabilizer leg of the plurality of stabilizer legs is connected to the second body piece at one end and to the centralizer alignment hole opposite the second body piece, and wherein the first moving stem is engaged within the centralizer alignment hole.

2. The back pressure valve of claim 1, wherein the guide plate comprises from four flow passageways to eight flow passageways.

3. The back pressure valve of claim 1, further comprising a plurality of running threads disposed on an inner surface of the first body piece.

4. The back pressure valve of claim 1, further comprising at least one detent notch formed in the first body piece for receiving a running tool.

5. The back pressure valve of claim 1, further comprising outer threads disposed on an outer surface of the second body piece for connecting the cylindrical two-piece body to the tubing hanger.

6. The back pressure valve of claim 1, further comprising a groove on an outer surface of the second body piece for receiving a seal.

7. The back pressure valve of claim 1, wherein the first moving stem comprises a first stem alignment flange engaged with the first pressure piston, and wherein the second moving stem comprises a second stem alignment flange engaged with the second pressure piston.

8. The back pressure valve of claim 1, further comprising:
   a. a first counter bore spring seat disposed on the plurality of stabilizer legs for receiving the first compression spring; and
   b. a second counter bore spring seat disposed in the guide plate for receiving the second compression spring.

9. The back pressure valve of claim 1, wherein the first body piece is threaded to the second body piece.

10. The back pressure valve of claim 1, further comprising a drilled or tapped hole configured to receive a set screw for preventing rotation of the first body piece relative to the second body piece.

* * * * *